US 6,701,754 B2

(12) United States Patent
Sullivan et al.

(10) Patent No.: US 6,701,754 B2
(45) Date of Patent: Mar. 9, 2004

(54) SCREEN FOR USE IN A GLASS FIBER BUSHING SYSTEM AND BUSHING SYSTEM THEREWITH (75) Inventors: Timothy A. Sullivan, Newark, OH (US); Byron L. Bemis, Newark, OH (US); Seshadri Srinivasan, Worthington, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 191 days.

(21) Appl. No.: 09/941,077

(22) Filed: Aug. 28, 2001

(65) Prior Publication Data

US 2003/0041627 A1 Mar. 6, 2003

(51) Int. Cl.7 ............................................... C03B 37/09
(52) U.S. Cl. ........................................... 65/495; 65/499
(58) Field of Search .................................... 65/495, 499

(56) References Cited

U.S. PATENT DOCUMENTS

| 225,667 | A | | 3/1880 | Walker |
|---|---|---|---|---|
| 3,013,095 | A | * | 12/1961 | Russell ........................ 65/495 |
| 3,328,144 | A | | 6/1967 | Glaser |
| 3,390,972 | A | | 7/1968 | Froberg |
| 3,416,906 | A | | 12/1968 | Glaser |
| 3,492,104 | A | | 1/1970 | Glaser |
| 3,511,916 | A | | 5/1970 | Sinclair et al. |
| 3,556,753 | A | | 1/1971 | Glaser |
| 3,628,930 | A | | 12/1971 | Harris |
| 3,810,741 | A | | 5/1974 | Stalego |
| 3,837,823 | A | | 9/1974 | Shealy |
| 3,840,358 | A | | 10/1974 | Whitfield, Jr. |
| 3,920,429 | A | | 11/1975 | Stalego |
| 3,926,600 | A | | 12/1975 | Stalego |
| 4,026,689 | A | | 5/1977 | Higginbotham |
| 4,043,778 | A | | 8/1977 | Harris |
| 4,200,485 | A | | 4/1980 | Price et al. |
| 4,416,678 | A | | 11/1983 | Bottger |
| 4,492,594 | A | | 1/1985 | Curley |
| 4,643,750 | A | | 2/1987 | Glaser |
| 4,759,974 | A | | 7/1988 | Barthe et al. |
| 5,780,122 | A | | 7/1998 | Shirahata et al. |
| 5,928,402 | A | | 7/1999 | Mirth et al. |
| 5,935,291 | A | | 8/1999 | Kim et al. |
| 6,065,310 | A | | 5/2000 | Higginbotham et al. |
| 6,070,437 | A | | 6/2000 | Sanik et al. |
| 6,272,887 | B1 | * | 8/2001 | Sullivan et al. ............... 65/495 |
| 6,453,702 | B1 | * | 9/2002 | Hanna et al. ................. 65/384 |

* cited by examiner

Primary Examiner—John Hoffmann
(74) Attorney, Agent, or Firm—Inger H. Eckert; Stephen W. Barns (57) ABSTRACT A screen comprises an electrically conductive elongate inner screen plate. The inner screen plate has at least one elongate fold therein and at least two elongate divergent surfaces on opposing sides of the fold. Each divergent surface has an upper end and opposing edges tapering downward from the upper end. The upper ends of the divergent surfaces diverge from one another. Each of the divergent surfaces has a plurality of holes therein. The screen further comprises at least two electrically conductive outer screen plates. The outer screen plates are attached to the edges of the divergent surfaces and extend between the divergent surfaces. Each of the outer screen plates has a plurality of holes therein. Another embodiment of the invention is directed toward a glass fiber bushing system comprising a bushing body and a screen within the bushing body. The bushing body has opposing end plates. The screen comprises opposing ends. Each of the ends has an upper portion and a lower portion. The upper portion of each of the ends is attached to one of the end plates. The lower portion of each of the ends is spaced apart from the end plates.

21 Claims, 6 Drawing Sheets

SCREEN FOR USE IN A GLASS FIBER BUSHING SYSTEM AND BUSHING SYSTEM THEREWITH

TECHNICAL FIELD AND INDUSTRIAL APPLICABILITY OF THE INVENTION

The present invention is related to a bushing screen for thermally conditioning the molten glass flowing down to an orifice plate in a glass fiber reinforcement manufacturing operation.

BACKGROUND OF THE INVENTION

In a glass fiber reinforcement manufacturing operation, a bushing is used to supply a plurality of molten glass streams, which are attenuated and drawn out to form fibers. Usually the bushing is in the form of a metal box having an elongate, generally rectangular shape. This box is commonly referred to as a bushing body. The bushing body is defined in part by opposing end plates and side plates. The upper bushing body has an opening through which a source of glass is supplied. The opening is commonly referred to as the throat portion of the upper bushing body. The bottom of the bushing body is defined by a bottom wall that is typically referred to as a tip plate. The bushing body is heated to a desired temperature by its own electrical resistance by passing electric current through the bushing body. The current is supplied to the end plate through an electrical terminal or ear that is welded to the end plate. To help retain the heat and give support to the bushing body, refractory insulation is provided about the end plates and side plates. The glass is conditioned to a desired temperature through thermal interaction with the resistance heated components of the bushing body. The bottom wall has a plurality of orifices through which the molten glass flows, forming heat-softened glass streams.

A screen is located within the upper portion of the upper bushing body. The screen extends in a longitudinal or lengthwise direction and is attached to the end plates. Prior to the 1980s, the primary role of the screen was to serve as a "stone catcher" and prevent glass contact refractory and glass inclusions from reaching the tip plate and resulting in problems with heat patterns and process interruptions. At that time, screens were flat. The end plates, side plates, and tip plate were the principle heat sources and contact surfaces to achieve thermal interaction between the bushing body and the glass. However, as tip counts (the number of orifices in the tip plate) and bushing bodies became larger and nominal throughputs significantly increased, the glass residency time and the intimacy of interaction between the incoming glass and the bushing body structure diminished substantially. It was necessary to find ways to supplement the thermal capacity of the bushing and improve its capability to influence the thermal profile of the glass within the bushing body.

It had become obvious that the screen could serve as a heating element to help refine internal glass temperatures. In the 1980s, more innovative V-shaped and W-shaped screen configurations began to replace the previously flat screens. The increased surface area of the newer shapes increased the amount of thermal interaction with the glass. In some cases, screen hole densities were reduced to increase current flow and screen operation temperatures. It was also observed that the V-shaped and W-shaped screens provided additional benefits with regard to internal glass flow and mixing. The folds and slanted surfaces of the new screens diverted glass flows toward the front and rear portions of the bushing tip plates and improved thermal homogeneity and tip section heat patterns in these directions.

Within the same time period, the multiple density (MD) screen concept was introduced to improve flow patterns and thermal mixing in the lengthwise dimension of the bushing. To implement the MD concept, a perforated area within the center portion of the bushing screen is reduced through changes in hole density and/or hole diameter. The resistance to flow is increased and a portion of the warmer glass that enters the center of the bushing is diverted toward the ends of the bushing. This hotter glass mixes with the cooler glass entering near the ends of the bushing and flows more readily through less flow resistant portions of the screen. This mixing action delivers a glass that is warmer and more thermally homogeneous to the end areas of the tip plate section that had previously demonstrated cooler forming cones and cooler fiber forming conditions.

Both the multiple density and folded screen concepts have been successfully implemented on a wide scale within direct melt bushing systems and have been very beneficial to bushing heat pattern uniformity and have assisted in achieving unprecedented levels of operational efficiency. However, there is still room for further tip section heat pattern improvement in bushings with folded screens. A significant amount of the current to heat internal screens is delivered through the bushing end plates. The portions of the end plates that are located above the location of the screen attachment have a much lower current density than the portion of the end plates that are located below the location of the screen attachment. This creates a current blind spot or an electrically deficient region. The average operating temperature of the end plates in these areas is substantially diminished. This reduces the overall effectiveness of the end plate as a bushing body heating element.

What is needed is an internal screen configuration that maintains the surface area heating and flow diverting benefits of the folded configurations and maximizes the heating capabilities of the bushing end plates. Increasing the heating capabilities of the bushing end plates will help insure delivery of a more thermally homogeneous glass to the bushing tip section.

SUMMARY OF THE INVENTION

The present invention is related to an internal screen configuration that improves the tip section heat pattern of a glass fiber bushing system by improving the internal glass flow patterns within a bushing body and maximizing the effectiveness of the end plate as a glass-heating source. One embodiment of the invention is directed toward a screen for use in a glass fiber bushing system. The screen comprises an electrically conductive elongate inner screen plate. The inner screen plate has at least one elongate fold therein and at least two elongate divergent surfaces on opposing sides of the fold. Each divergent surface has an upper end and opposing edges tapering downward from the upper end. The upper ends of the divergent surfaces diverge from one another. Each of the divergent surfaces has a plurality of holes therein. The screen further comprises at least two electrically conductive outer screen plates. The outer screen plates are attached to the edges of the divergent surfaces and extend between the divergent surfaces. Each of the outer screen plates has a plurality of holes therein.

Another embodiment of the invention is directed toward a glass fiber bushing system comprising a bushing body and a screen within the bushing body. The bushing body has opposing end plates. The screen comprises opposing ends. Each of the ends has an upper portion and a lower portion. The upper portion of each of the ends is attached to one of the end plates. The lower portion of each of the ends is spaced apart from the end plates.

Another embodiment of the invention is directed toward a glass fiber bushing system comprising an electrically conductive bushing body and a screen. The bushing body comprises opposing end plates, elongate side plates extending between the end plates, and a tip plate extending between the end plates and the side plates. An opening atop the bushing body defines a throat portion of the bushing body. Opposing electrically conductive terminals are connected to the end plates. An electrically conductive screen is located within the throat portion of the bushing body. The screen comprises an elongate inner screen plate. The inner screen plate has at least one elongate fold therein and at least two elongate divergent surfaces on opposing sides of the fold. Each divergent surface has an upper end and opposing edges. The upper ends of the divergent surfaces diverge from one another. Each of the divergent surfaces has a plurality of holes therein. A pair of opposing outer screen plates are attached to the edges of the divergent surfaces and extend between the divergent surfaces. Each of the outer screen plates has a plurality of holes therein. Each of the outer screen plates has an upper end attached to one of the end plates of the bushing body.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Referring now to the drawings, there is illustrated in FIGS. 1–5 a glass fiber bushing system according to the invention. The system comprises a bushing 10 used to supply molten glass streams (not shown), which are attenuated to form glass fibers. The bushing 10 is basically comprised of an electrically conductive bushing body 12 and an electrically conductive screen 14 located within the bushing body 12.

In the preferred embodiment of the invention, the bushing body 12 is in the form of a metal box having an elongate, substantially rectangular shape. The bushing body 12 is defined in part by opposing end plates 16 and elongate side plates 18 extending between the end plates 16. The bottom of the bushing body 12 is defined by a tip plate 20 having a plurality of orifices 21 formed therein, preferably including tubular members, as described in commonly-assigned U.S. Pat. No. 4,161,646, which is incorporated herein by reference. The tip plate 20 extends in a side to side or longitudinal direction between the end plates 16 and a front to rear or lateral direction between the side plates 18. An opening is provided at the top of the bushing body 12 for receiving molten glass from a refractory. The opening is defined by a throat portion 22 of the bushing body 12.

A pair of opposing electrical terminals or ears 24 is attached to the opposing end plates 16. In the preferred embodiment of the invention, the ears 24 are attached to a lower portion 34 of the end plates 16. The ears 24 are adapted to be connected to a source of current (not shown). Current is adapted to flow through the ears 24 and further into and through the bushing body 12.

Figure 5:
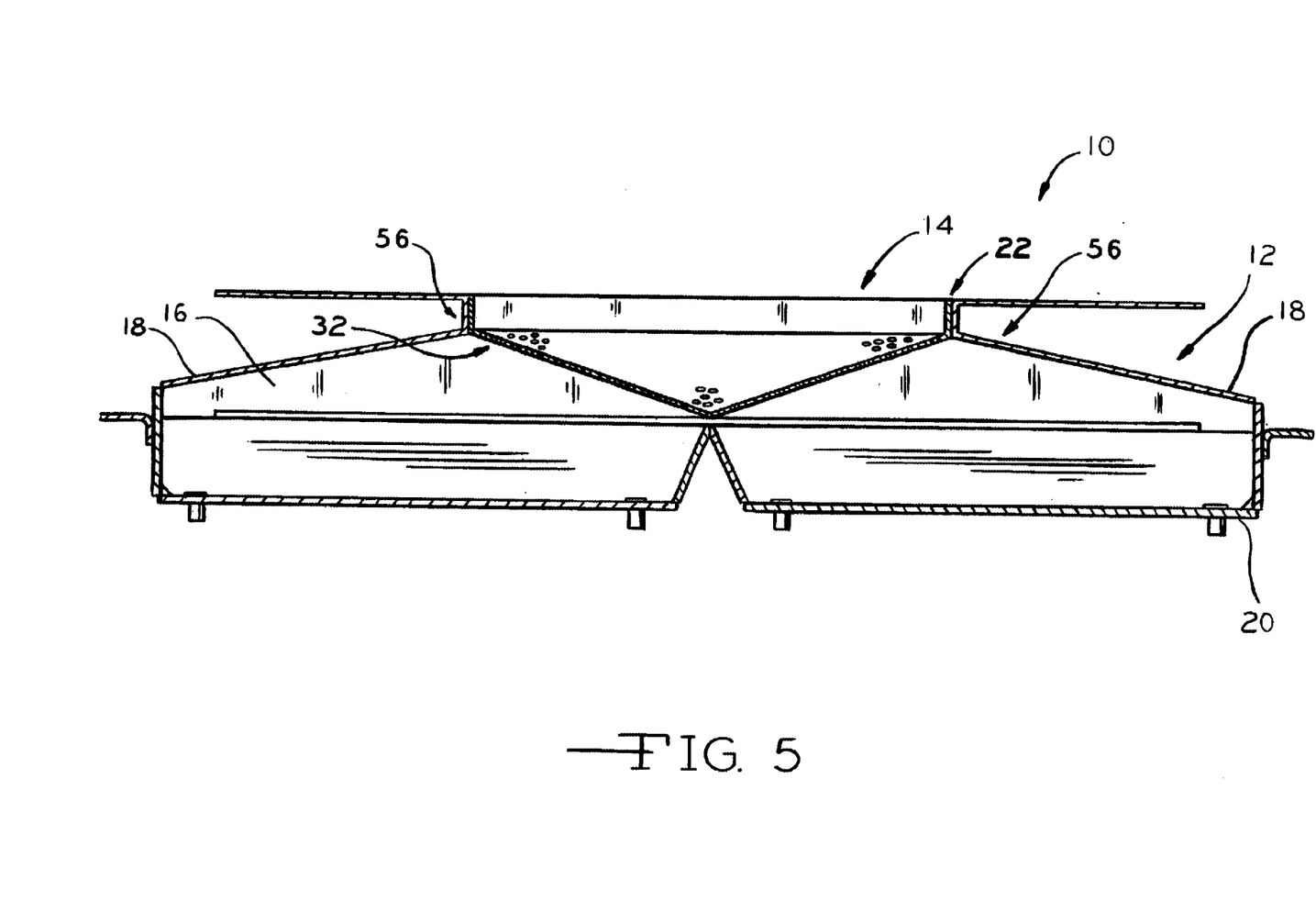
FIG. 5 is a cross-sectional view of the system taken along the line 5—5 in FIG. 1.

As clearly shown in FIG. 5, the screen 14 is attached within the throat portion 22 of the bushing body 12. The screen 14 has opposing ends, generally indicated at 26 (shown in FIG. 7). Each of the ends 26 has an upper portion 28 and a lower portion 30 (shown in FIG. 9). The upper portion 28 of each one of the ends 26 is attached to an upper portion 32 of a corresponding one of the end plates 16. The lower portion 30 of each one of the ends 26 is spaced apart from the end plates 16 so that it is not in contact or electrically connected to the end plates 16. According to this configuration, current is adapted to flow through the ears 24 into the end plates 16 from a lower portion 34 of the end plates 16 to the upper portion 32 of the end plates 16, as indicated by directional arrows I in FIG. 2.

Figures 6, 7, 8:
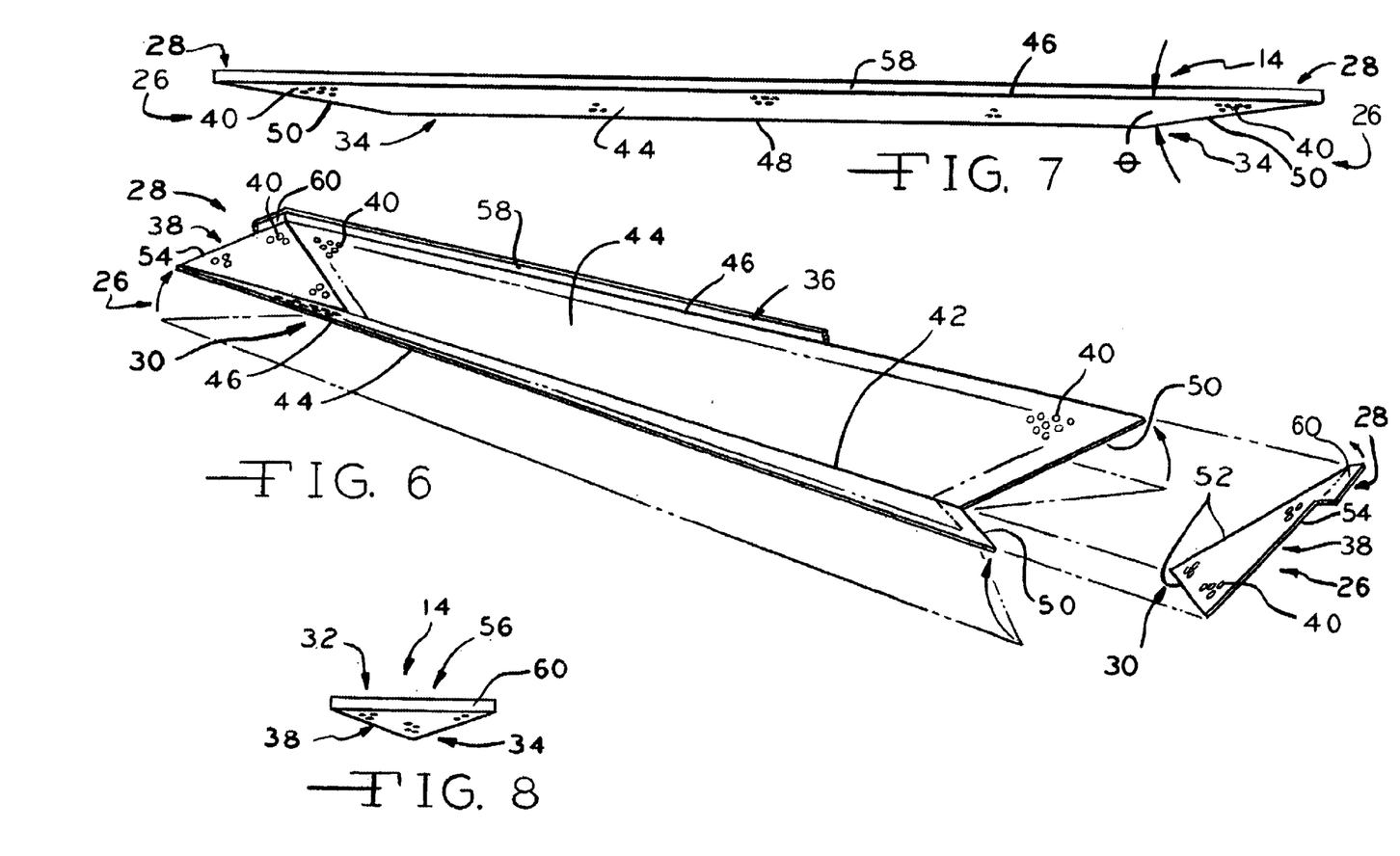
FIG. 6 is a partially exploded perspective view of a screen according to the invention.
FIG. 7 is a side elevational view of the screen shown in FIG. 6.
FIG. 8 is an end view of the screen shown in FIGS. 6 and 7.

As shown in FIGS. 6–8, the screen 14 is preferably in the form of a metal basket comprised of an elongate inner screen plate 36 and opposing outer screen plates 38 attached to the inner screen 36. The inner and outer screen plates 36 and 38 are provided with holes 40 through which molten glass may pass. One function of the screen 14 is to serve as a stone catcher and to prevent glass contact refractory and glass inclusions from reaching the tip plate 20. Another function of the screen is to thermally condition the glass within the bushing body 12.

The inner screen plate 36 can be formed from a single sheet of metal having at least one elongate fold 42 therein and at least two elongate divergent surfaces 44 on opposing sides of the fold 42. Each divergent surface 44 has an upper end 46, a lower end 48, and opposing edges 50. The edges 50 of the divergent surfaces 44 are preferably disposed at an angle θ less than 90 degrees relative to upper ends 46 of the divergent surfaces 44, as shown in FIG. 7. The upper ends 46 of the divergent surfaces 44 diverge from one another. The lower ends 48 of the divergent surfaces 44 cooperatively define an apex at the fold 42. Each of the divergent surfaces 44 has a plurality of holes 40 therein.

The outer screen plates 38 are attached to the opposing edges 50 of the divergent surfaces 44 and extend between the divergent surfaces 44. Each outer screen plate 38 has opposing edges 52. Each one of the opposing edges 52 of the outer screen plates 38 is attached to a corresponding edge 50 of a corresponding inner screen plate 36. The point of attachment preferably forms a seal against fluid flow and insures electrical continuity between the inner and outer screen plates 36 and 38. The outer screen plates 38 have a plurality of holes 40 therein.

Figure 1:
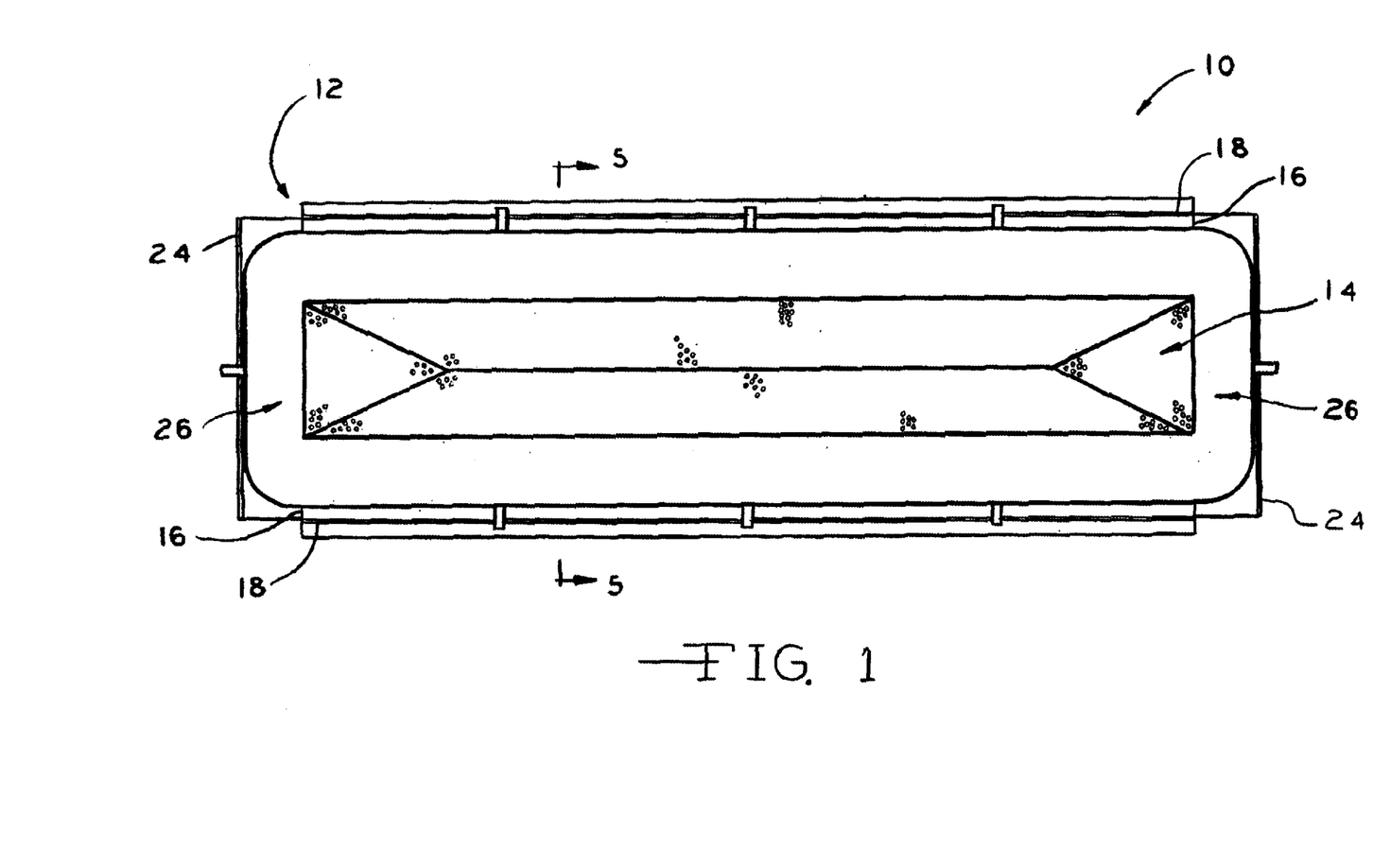
FIG. 1 is a top plan view of a glass fiber bushing system according to the invention.
Figures 2, 3:
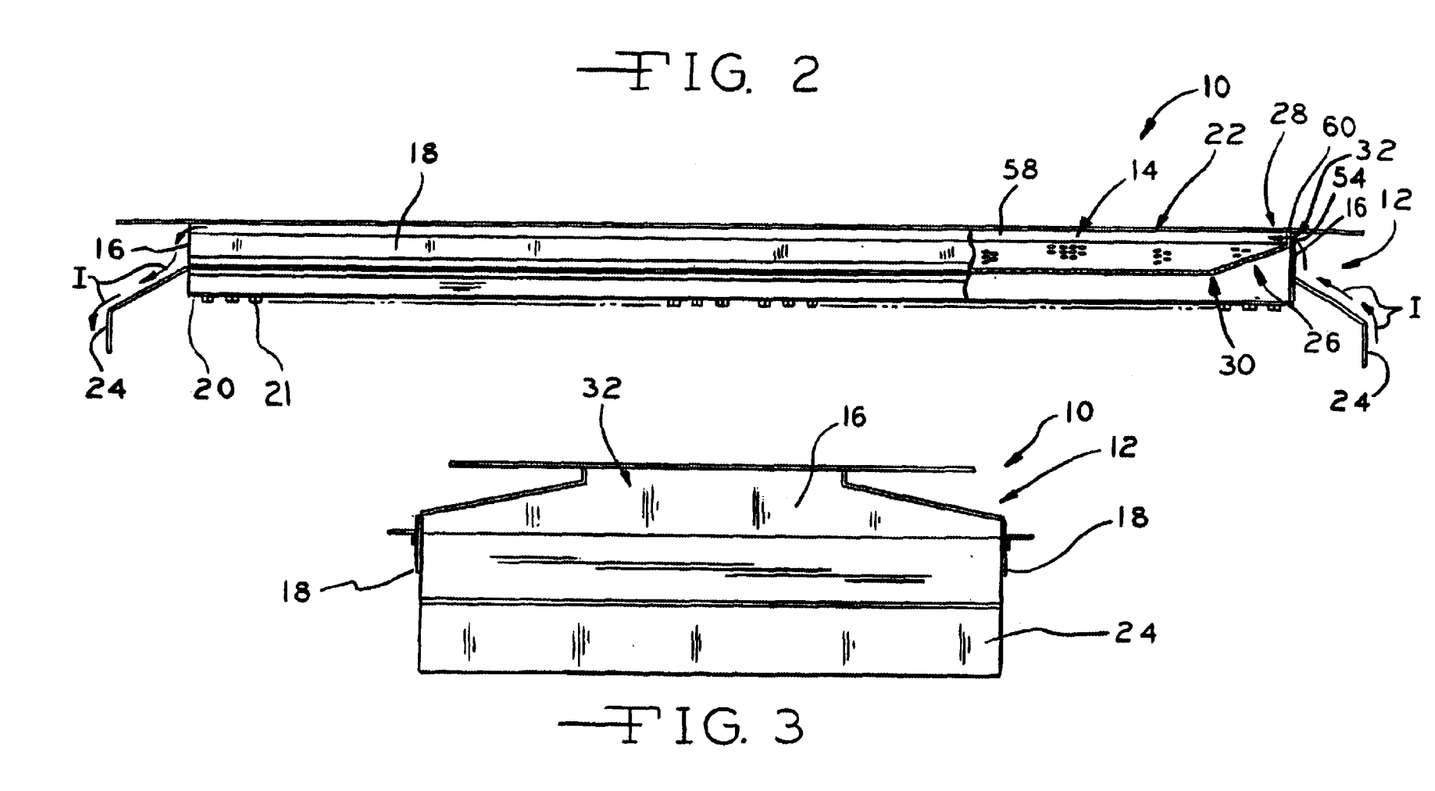
FIG. 2 is a side elevational view of the system shown in FIG. 1.
FIG. 3 is an end view of the system shown in FIGS. 1 and 2.
Figure 4:
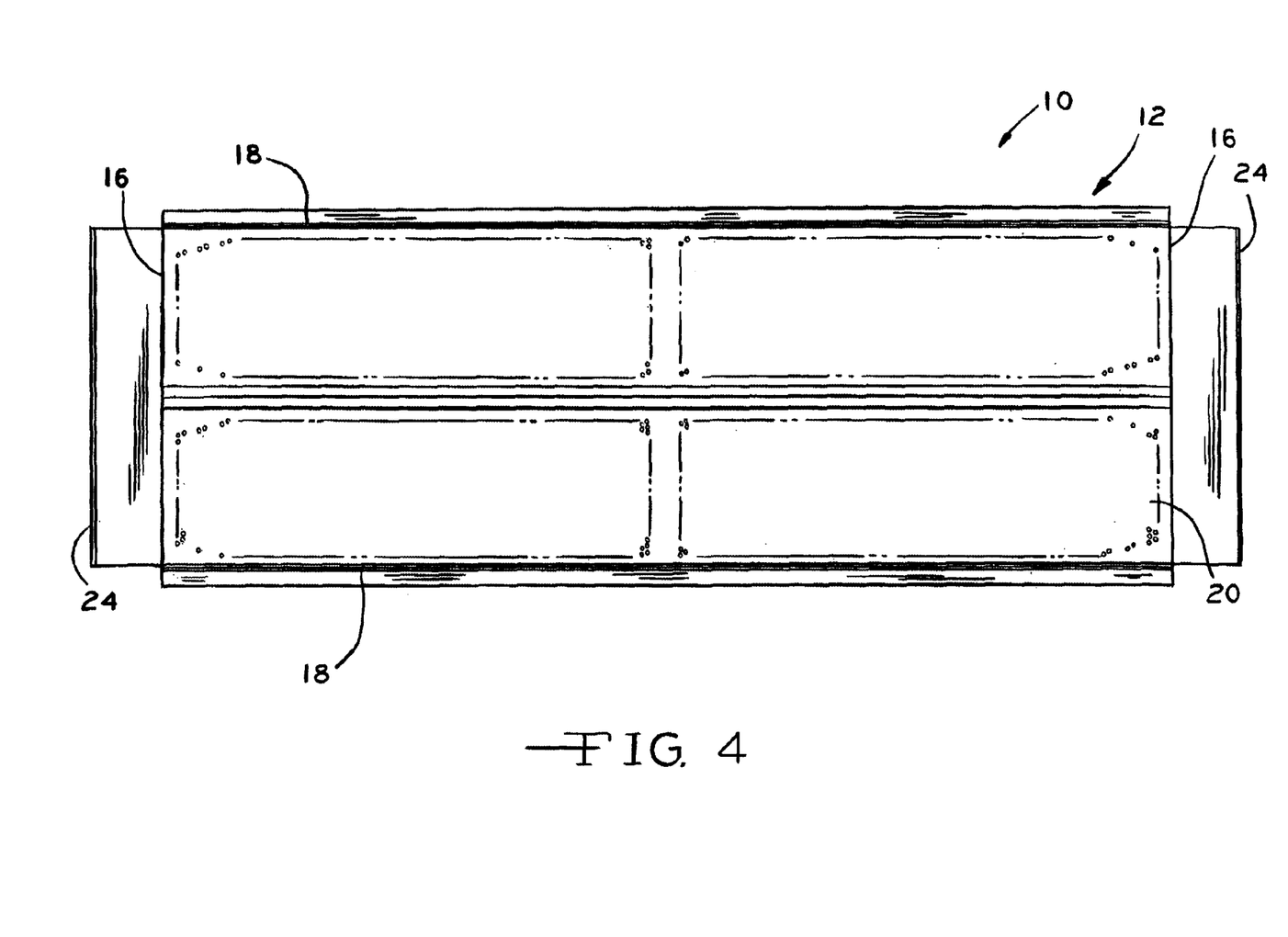
FIG. 4 is a bottom plan view of the system shown in FIGS. 1–3.

The upper ends 46 of the divergent surfaces 44 and upper ends 54 of the outer screen plates 38 are respectively attached to the upper portions 56 of the side plates 18, as shown in FIG. 5, and the upper portions 32 of the end plates 16, as shown in FIG. 2. By attaching the upper ends 54 of the outer screen plates 38 to the upper portions 32 of the end plates 16, the amount of unaffected heating surface (below the point of attachment) on the end plates 16 that is available to interact with the molten glass in the bushing body 12 is minimized.

In a preferred embodiment of the invention, the upper ends 46 and 54 of the divergent surfaces 44 and outer screen plates 38 are provided with tabs 58 and 60 that cooperatively form an upper peripheral tab for the screen 14. The tabs 58 and 60 may be provided by bending the upper ends 46 and 54 of the divergent surfaces 44 and outer screen plates 38. The tabs 58 and 60 provide a surface that can easily be attached to the end plates 16 and side plates 18. The tabs 58 and 60 can be attached to the end plates 16 and side plates 18 in any suitable manner. One manner in which the tabs 58 and 60 can be attached to the end plates 16 and side plates 18 is by welding the tabs 58 and 60 to the end plates 16 and side plates 18.

Figure 9:
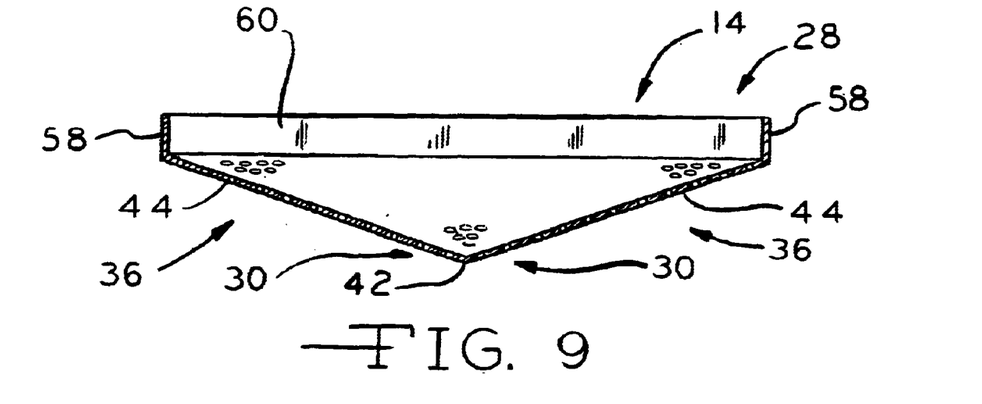
FIG. 9 is a cross-sectional view of the screen shown in FIGS. 6–8.
Figure 10:
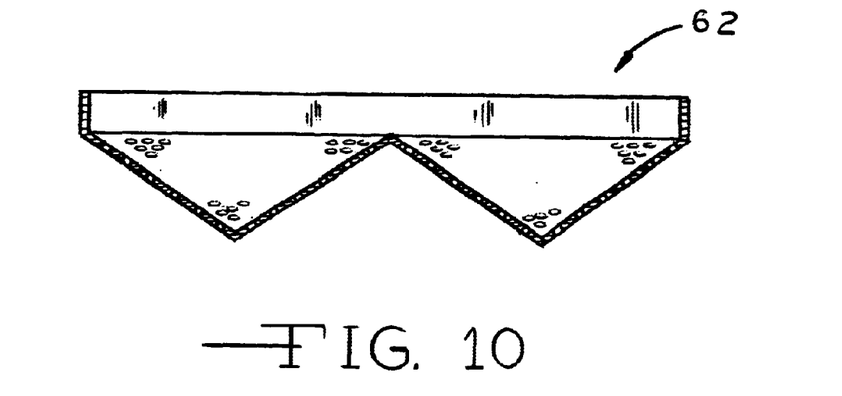
FIG. 10 is a cross-sectional view of another screen according to the invention having a W-shaped cross-section.
Figure 11:
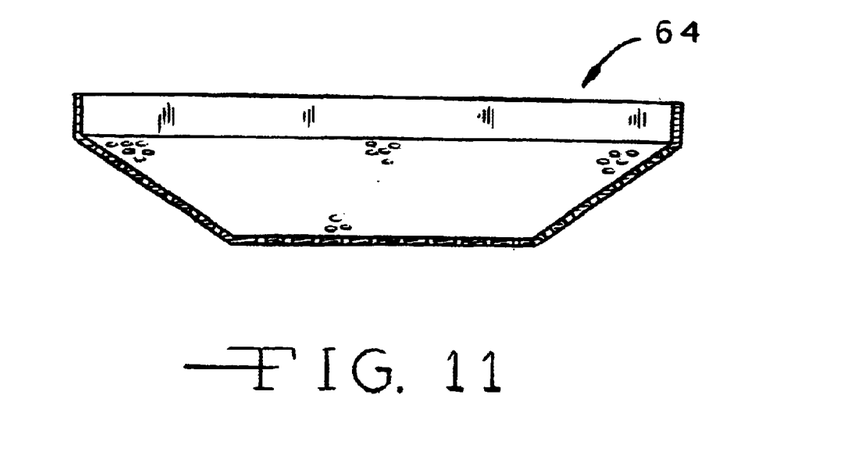
FIG. 11 is a cross-sectional view of another screen according to the invention having a trapezoidal cross-section.

It should be appreciated by one of ordinary skill in the art that the screen 14 can be of various shapes. For example, the screen 14 can have a V-shaped cross-section as shown in FIG. 9. A screen 62 having a W-shaped cross-section is shown in FIG. 10. Another screen 64 having a trapezoid-shaped cross-section is shown in FIG. 11. These screens 14, 62, and 64 provide a fold or folds that extend into the bushing body and provide the required heating surface and flow diversion capabilities. The tapered or slanted orientation of the outer screen plates 38 will provide an additional enhancement to internal glass flow patterns and result in a more uniform tip section heat pattern.

The screen configurations shown are provided for illustrative purposes. It should be understood that other screen configurations can be suitable for carrying out the invention.

In operation, current flows through the ear 24 into and through the end plates 16 and through other components of the bushing body 12, including the screen 14, the side plates 18, and the tip plate 20. The current for all of the bushing body components initially passes through the ear 24, and then is introduced into the end plate 16. From there, the current is distributed to the screen 14 and the tip plate 20 in various proportions. Intensities vary with the location and thickness of the bushing body components and with the relative resistances of the components to current flow. The components of the bushing body 12 serve as resistance heaters and, in composite, they provide the total thermal heating capacity of the bushing 10 as it interacts with the incoming molten glass.

The effectiveness of the end plate 16 as a heater or radiator to the molten glass in the bushing body 12 is to be a factor in determining the thermal uniformity of the molten glass introduced to the ends of the tip section (the section of the bushing body 12 adjacent the end plates 16 and tip plate 20). Increasing the heat capacity near the end plates 16 will assist in balancing internal glass temperatures within the bushing body 12 before the glass reaches the tip section.

Current that enters the end plate 16 splits into fractions that are directed downward to the tip plate 20, upward and sideways to the bushing side plates 18, and upward to the bushing screen 14. The screen 14 is generally the principal uppermost element in the bushing body 12 that receives current from the end plate 16. Current to the side plates 18 is generally delivered at a lower elevation above the ear 24 than the current to the screen 14. The farther the current flows upward before it reaches the screen 14, the more resistance heating it can accomplish in the end plate 16 before it reaches the attachment point of the screen 14 and the more energy that is available to transfer to the molten glass through conduction and radiation. The higher that the attachment point of the end plate 16 and screen 14 can be located, the more effectively the end plate 16 can serve as a heating element.

If the screen 14 is folded into a V-shaped or W-shaped configuration, advantages are associated with the additional alloy related to additional heat transfer and thermal interaction with the glass, as well as benefits from the alteration of internal glass flow patterns, internal mixing, and thermal homogenization. Conventional bushings have been deficient because the folds in the screen require a lower attachment point between the screen and the end plate at the apex of the folds. This results in a current transfer from the end plate to the screen at a lower elevation and thus less effective heating by the upper portion of the end plate. The screen configuration of the present invention will maximize the heat generation in the end plates 16 due to the longer current path in the end plates 16.

One advantage of the present invention is to provide a screen in the form of a basket that permits a higher attachment point of the screen to the end plates 16.

Another advantage of the invention is to increase the heating capabilities of the end plates 16 and preferentially direct molten glass from the refractory to the area of influence of the end plates 16 to insure delivery of a more thermally homogeneous glass to the bushing tip section below the screen 14. That is to say, the ends 26 of the screen 14 provide additional capability of internally directing glass flow toward hotter end plates 16 of the bushing body 12 that is superior to any known screen design.

Another advantage of the invention is to allow better control or evenness of the current flow in the screen 14, thereby producing greater uniformity of the temperature of the molten glass, and consequently a better quality fiberglass product.

Another advantage of the invention is that the tapered ends 26 of the screen 14 direct the flow of molten glass in an advantageous pattern. As the molten glass flows through the tapered ends 26 of the screen 14, the glass is directed to flow through the screen 14.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A screen for use in a glass fiber bushing system, comprising:
   an electrically conductive elongate inner screen plate having at least one elongate fold therein and at least two elongate divergent surfaces on opposing sides of the fold, each of the divergent surfaces having an upper end and opposing edges tapering downward from the upper ends, the upper ends of the divergent surfaces diverging from one another, each of the divergent surfaces having a plurality of holes therein; and
   at least two electrically conductive outer screen plates, each one of the screen plates being attached to one of the edges of the divergent surfaces and extending between the divergent surfaces, each of the outer screen plates surfaces having a plurality of holes therein.

2. The screen of claim 1, wherein the upper ends of the divergent surfaces each has an elongate tab and the outer screen plates each has an upper end and a tab at the upper end.

3. The screen of claim 1, wherein the edges of the divergent surfaces are disposed at an angle less than 90 degrees relative to upper ends of the divergent surfaces.

4. The screen of claim 1, wherein the inner screen plate has a V-shaped cross-section and the outer screen plates are triangular.

5. The screen of claim 1, wherein the inner screen plate has a W-shaped cross-section and the outer screen plates are W-shaped.

6. The screen of claim 1, wherein the inner screen plate has at least two folds including the at least one fold and at least one elongate flat surface extending between the divergent surfaces, and wherein outer screen plates are trapezoidal.

7. A glass fiber bushing system comprising:
   a bushing body having opposing end plates; and
   a screen within the bushing body, the screen comprising opposing ends, each of the ends having an upper portion and a lower portion, the upper portion of each of the ends being attached to one of the end plates, the lower portion of each of the ends being spaced apart from the end plates.

8. The system of claim 7, wherein the end plates each has an upper end and the upper portions of the ends of the screen are attached to the upper ends of the end plates.

9. The system of claim 7, wherein the end plates each has an upper end and the upper portions of the ends of the screen have tabs, the tab of the ends being attached to the upper ends of the end plates.

10. The system of claim 7, wherein the screen has a V-shaped cross-section and the side ends are triangular.

11. The system of claim 7, wherein the screen has a W-shaped cross-section and the side ends are W-shaped.

12. A glass fiber bushing system comprising:
   an electrically conductive bushing body comprising opposing end plates, elongate side plates extending between the end plates, a tip plate extending between the end plates and the side plates, and an opening atop the bushing body defined by a throat portion of the bushing body;
   a pair of opposing electrically conductive terminals, each one of the terminals being connected to one of the end plates; and
   an electrically conductive screen located within the bushing body, the screen comprising:
      an elongate inner screen plate having at least one elongate fold therein and at least two elongate divergent surfaces on opposing sides of the fold, each divergent surface having an upper end and opposing edges, the upper ends of the divergent surfaces diverging from one another, each of the divergent surfaces having a plurality of holes therein; and
      at least two outer screen plates attached to the edges of the divergent surfaces and extending between the divergent surfaces, each of the outer screen plates having an upper end attached to one of the end plates of the bushing body, each of the outer screen plates having a plurality of holes therein.

13. The system of claim 12, wherein the upper end of each of the divergent surfaces has an elongate tab and the outer screen plates each has an upper end and a tab at the upper end.

14. The system of claim 12, wherein the edges of the divergent surfaces are disposed at an angle less than 90 degrees relative to upper ends of the divergent surfaces.

15. The system of claim 12, wherein the screen has a V-shaped cross-section and the outer screen plates are triangular.

16. The system of claim 12, wherein the screen has a W-shaped cross-section and the outer screen plates are W-shaped.

17. The system of claim 12, wherein the inner screen plate has at least two folds including the at least one fold and at least one elongate flat surface extending between the divergent surfaces, and wherein outer screen plates are trapezoidal.

18. The system of claim 12, wherein the tip plate has a plurality of holes therein.

19. The system of claim 18, wherein the holes in the tip plate have tubular orifices therein.

20. The system of claim 19, wherein the tubular orifices are laser welded in the holes.

21. A direct-melt bushing screen for use in a fiber forming bushing, comprising:
   an electrically conductive elongate inner screen plate having at least one elongate fold therein and at least two elongate divergent surfaces on opposing sides of the fold, each of the divergent surfaces having an upper end and opposing edges tapering downward from the upper ends, the upper ends of the divergent surfaces diverging from one another, each of the divergent surfaces having a plurality of holes therein; and
   at least two electrically conductive outer screen plates, each one of the screen plates being attached to one of the edges of the divergent surfaces and extending between the divergent surfaces, each of the outer screen plates surfaces having a plurality of holes therein, the holes in the divergent surfaces and the holes in the outer screen plates surfaces being sized to prevent impurities from passing therethrough.

* * * * *